United States Patent
Atkinson et al.

(10) Patent No.: US 10,116,698 B1
(45) Date of Patent: Oct. 30, 2018

(54) MANAGING NETWORK FIREWALL CONFIGURATION UTILIZING SOURCE LISTS

(71) Applicant: Amazon Technologies, Inc., Seattle, WA (US)

(72) Inventors: Lee Atkinson, London (GB); Nathan Alan Dye, Seattle, WA (US); Rich Vorwaller, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 227 days.

(21) Appl. No.: 15/092,513

(22) Filed: Apr. 6, 2016

(51) Int. Cl.
  *G06F 11/30* (2006.01)
  *H04L 29/06* (2006.01)

(52) U.S. Cl.
  CPC .............. *H04L 63/20* (2013.01); *H04L 63/02* (2013.01)

(58) Field of Classification Search
  CPC .................................. H04L 63/20; H04L 63/02
  See application file for complete search history.

(56) References Cited

U.S. PATENT DOCUMENTS

| | | | | |
|---|---|---|---|---|
| 7,617,526 B2* | 11/2009 | Davis | ............ | H04L 63/1458 713/178 |
| 7,649,886 B2* | 1/2010 | Miller | ............ | H04L 63/0236 370/392 |
| 8,473,613 B2* | 6/2013 | Farber | ............ | G06F 9/505 709/219 |
| 9,118,707 B2* | 8/2015 | Sun | ............ | H04L 63/1458 |
| 2003/0086422 A1* | 5/2003 | Klinker | ............ | H04L 29/06 370/389 |
| 2005/0021806 A1* | 1/2005 | Richardson | ............ | H04L 12/5601 709/231 |
| 2005/0022011 A1* | 1/2005 | Swander | ............ | H04L 63/0227 726/4 |
| 2005/0114704 A1* | 5/2005 | Swander | ............ | H04L 63/0263 726/4 |
| 2005/0138413 A1* | 6/2005 | Lippmann | ............ | G06F 21/577 726/4 |
| 2006/0037070 A1* | 2/2006 | Davis | ............ | H04L 63/1458 726/11 |
| 2006/0137009 A1* | 6/2006 | Chesla | ............ | G06F 21/552 726/22 |

(Continued)

OTHER PUBLICATIONS

STIC search strategy (requested Jan. 9, 2017).*

*Primary Examiner* — Sharon S Lynch
(74) *Attorney, Agent, or Firm* — Knobbe, Martens, Olson & Bear, LLP

(57) ABSTRACT

Systems and methods for configuration of network-based firewall services based on network firewall configuration information provided by one or more sources are provided. The network firewall configuration information can include one or more lists of network address ranges that will be used by the network firewall to process data communications received at a data center. The received network firewall configuration information can be prioritized and filtered to conform to a maximum threshold number of network address ranges that can be configured on a network firewall service. The filtered and processed network address range information can then be utilized to configure one or more network firewall services or application hosted within a data center.

20 Claims, 7 Drawing Sheets

(56) References Cited

U.S. PATENT DOCUMENTS

| | | | |
|---|---|---|---|
| 2006/0182034 A1* | 8/2006 | Klinker | H04L 43/00 370/238 |
| 2006/0285493 A1* | 12/2006 | Manuja | H04L 29/06027 370/235 |
| 2009/0182818 A1* | 7/2009 | Krywaniuk | H04L 51/12 709/206 |
| 2014/0173722 A1* | 6/2014 | Sun | H04L 63/1458 726/22 |
| 2014/0244840 A1* | 8/2014 | Sweeney | H04L 63/101 709/225 |
| 2014/0282830 A1* | 9/2014 | Davis, Jr. | H04L 63/0227 726/1 |
| 2015/0310374 A1* | 10/2015 | Allam | G06Q 10/0637 705/7.42 |

* cited by examiner

MANAGING NETWORK FIREWALL CONFIGURATION UTILIZING SOURCE LISTS

BACKGROUND

Generally described, organizations operate computer networks that interconnect numerous computing systems in support of the organizations' operations. Data centers may house significant numbers of interconnected computing systems, such as private data centers operated by a single organization and public data centers operated by third parties to provide computing resources to customers. Public and private data centers may provide network access, power, hardware resources (e.g., computing and storage), and secure installation facilities for hardware owned by an organization or its customers.

To facilitate increased utilization of data center resources, virtualization technologies allow a single physical computing machine to host one or more instances of virtual machines that appear and operate as independent computer machines to a connected computer user. With virtualization, a single physical computing device can create, maintain or delete virtual machines in a dynamic manner. In turn, users can request computer resources from a data center and be provided with varying numbers of virtual machine resources on an "as needed" or "as requested" basis. In addition to virtual machines, a data center may provide other computing resources, including hardware computing capacity, data storage space, network bandwidth, and the like.

Individual customers may reserve/purchase specified network resources, such as a specific amount of virtual machine instances, storage/memory space, network bandwidth, or other computing resources in support of the customers' operations. Additionally, individual customers can utilize services provided by the data center or third parties that facilitate the execution or management of the resources utilized at the data center. Examples of such services include, but are not limited to, various security services to manage security issues related to receipt and processing of network based communications.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, aspects of the present disclosure relate to management of communication utilizing data center resources. More specifically, aspects of the present disclosure are directed to configuration of network-based firewall services based on network firewall configuration information provided by one or more sources. Illustratively, the network firewall configuration information can include one or more lists of network address ranges that can be processed to be used by a network firewall service to process data communications received at a data center. In one embodiment, the list of network address ranges corresponds to a list of network address ranges that have been suggested to be blocked or processed further by a firewall service. The network firewall service can block, filter or otherwise further process any communications received at the firewall in which a source network address falls within one of the identified network address ranges.

The received network firewall configuration information can be prioritized and filtered to conform to a maximum threshold number of network address ranges that can be configured on a network firewall service. Illustratively, the prioritization of the network firewall configuration information can be based on the number of potential network addresses encompassed by a network address range. Additional processing to remove duplicate network address range entries or conform a specified network address range to a format supported by the network firewall service can also be implemented. Further, additional or alternative prioritization rules, such as weights associated with sources, historical performance adjustments, and the like may also be implemented. The filtered and processed network address range information can then be utilized to configure one or more network firewall services or application hosted within a data center.

Although aspects of some embodiments described in the disclosure will focus, for the purpose of illustration, on the processing of specific network configuration information, such as lists of network address ranges, one skilled in the relevant art will appreciate that the examples are illustrative only and are not intended to be limiting. More specifically, although many of the examples in the present application will be described in the context of a 32-bit network addressing environment, such examples are illustrative in nature and should not be construed as limiting. For example, the present application may be applicable to different type of network addressing environments, such as 128-bit network addressing environment. Additionally, in some embodiments, the techniques described herein may be applied to additional or alternative network firewall configuration information. For example, at least aspects of the present application may be applicable in the context of a domain name service ("DNS") networking environment.

Figure 1:
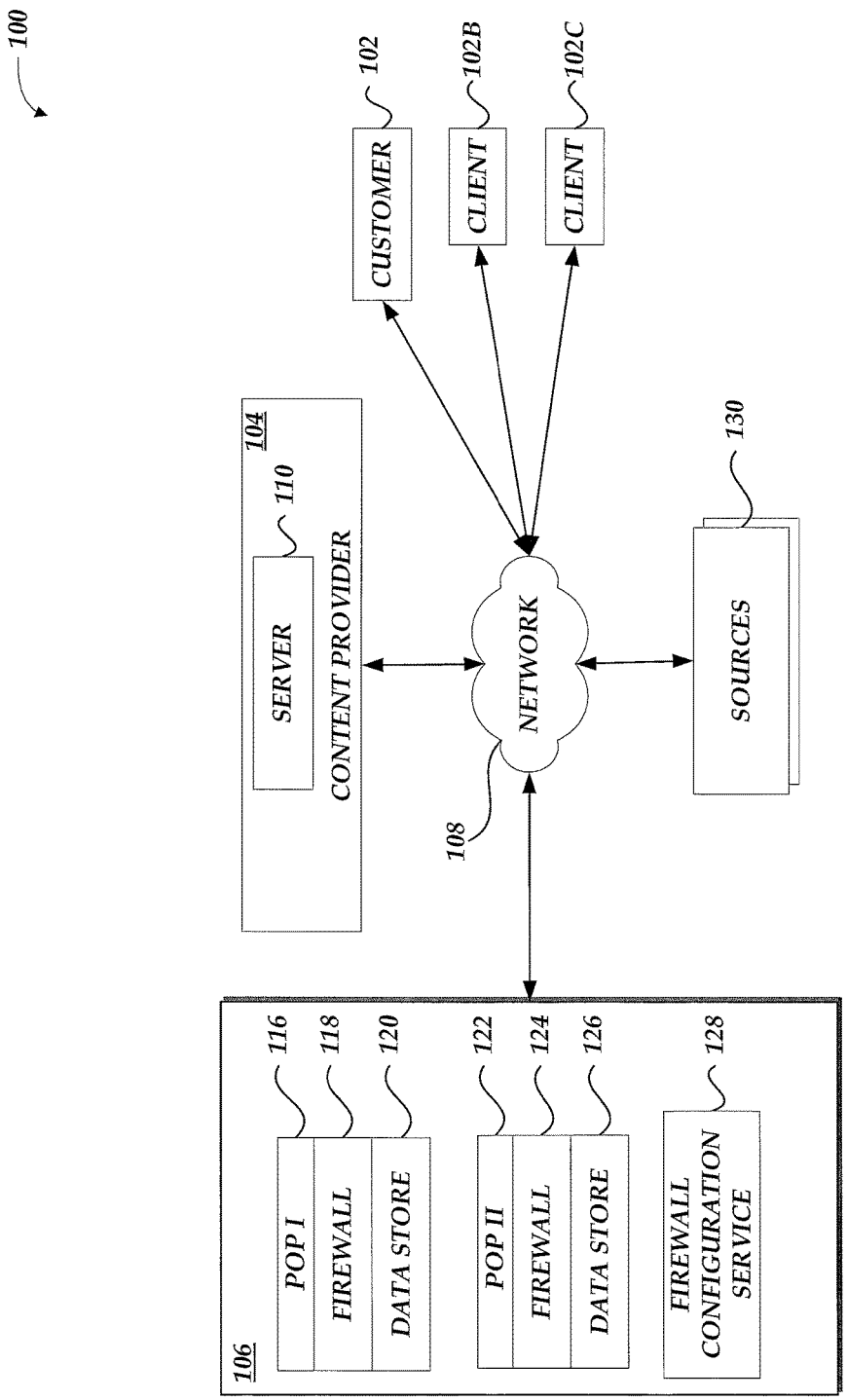
FIG. 1 is a block diagram illustrative of an example communication management environment compatible with certain embodiments described herein, the example content delivery environment including a number of client devices, a content provider, and a content network firewall service provider.

FIG. 1 is a block diagram illustrative of an illustrative communication management environment 100 for the management and processing of communications with certain embodiments described herein. As illustrated in FIG. 1, the communication management environment 100 includes a number of client devices 102, 102B, and 102C (generally referred to as clients). As will be described in greater detail below, clients 102, 102B, and 102C can correspond to various computing devices that may be utilized by various entities associated with the communication management environment 100. In one example, client device 102 can correspond to a device utilized by a customer or user of a network firewall service provider to select and configure various network firewalls executed by the network firewall service on behalf of the customer. In another example, client devices 102B and 102C corresponds to independent computing devices that are configured to transmit requests for content/information provided by a content provider, or providing any type of network communications associated with identified entities. In this regard, the operation of client device 102 and client devices 102B, 102C may differ based on the implementation of the function implemented by each respective client device. Accordingly, for purposes of example, client device 102 may be referred to generally as a customer device to refer to a device utilized to process information for configuration of a network firewall.

Illustratively, the client devices 102, 102B, and 102C can correspond to a wide variety of devices including personal computing devices, laptop computing devices, hand-held computing devices, server computing devices, terminal computing devices, mobile devices (e.g., smartphones, tablets), wireless devices, various electronic devices (e.g., televisions) and appliances, and the like. In an illustrative embodiment, the client devices 102, 102B, and 102C include necessary hardware and software components for establishing communications over a communication network 108, such as a wide area network or local area network. For example, the client devices 102 may be equipped with networking equipment and browser software applications that facilitate communications via the Internet or an intranet.

As also illustrated in FIG. 1, the communication management environment 100 can also include the content provider 104 configured to communicate with the one or more client devices 102 via the communication network 108. The content provider 104 illustrated in FIG. 1 comprises a logical association of one or more computing devices associated with the content provider. By way of example, the content provider 104 can include one or more server components devices 110 for obtaining and processing requests for content or services from the client devices 102. One skilled in the relevant art will appreciate that the content provider 104 can be associated with various additional computing resources, such additional computing devices for administration of content and resources, and the like. Additionally, in some embodiments, the content provider 104, or devices associated with the content provider, may be physical machines or virtual machine instances provided by a third party service provider, such as a data center provider.

With continued reference to FIG. 1, the communication management environment 100 can further include a network firewall service provider 106 configured to communicate with the one or more client devices 102 and with the content provider 104 via the communication network 108. The network firewall service provider 106 illustrated in FIG. 1 comprises a logical association of one or more computing devices associated with the network firewall service provider 106. Specifically, the network firewall service provider 106 can comprise a number of Point of Presence ("POP") locations 116, 122, which also can be generally referred to as Point of Delivery locations or "PODs," that correspond to nodes on the communication network 108. As illustrated in FIG. 1, each POP 116, 122 also includes at least one resource cache component 120, 126 having a network based firewall application or service (generally referred to as network firewall) configured to receive communications intended for the content provider 104. The network firewall processes the received communications to determine whether the communications, such as network data packets, should be forwarded to the content provider 104 or otherwise filtered, dropped or processed further in accordance with configuration rules associated with the content provider. The various configuration rules or other processing information may be maintained in local data stores 120 or remote data stores.

The network firewall service provider 106 can further include a firewall configuration service 106 that corresponds to a component or application configured to cause the configuration of the network firewall service/application 118, 124 at each POP 116, 122 or the distribution of configuration of the network firewall service. The network firewall configuration service 106 may be implemented in a standalone application in a physical machine, in one or more virtualized environments or distributed among a plurality of network devices.

In an illustrative embodiment, although the POPs 116, 122 and the firewall configuration service 128 are illustrated in FIG. 1 as logically associated with the network firewall service provider 106, the POPs can be geographically distributed throughout the communication network 108 in a manner to best serve various demographics of client devices 102. Additionally, one skilled in the relevant art will appreciate that the network firewall service provider 106 can be associated with various additional computing resources, such as additional computing devices for administration of content and resources, and the like.

With continued reference to FIG. 1, the communication management environment 100 can also include a plurality of sources 130 for publishing network firewall configuration information. As will be explained in greater detail below, a client device 102 associated with a content provider 104 can execute an application or set of instructions, such as a script, that can receive published network firewall configuration information and process the published network firewall configuration information. The processed network firewall configuration information is used to generate configuration information for a network firewall or set of network firewalls associated with the content provider 104. The sources 130 correspond to computing devices or network sources that make the network firewall configuration information available to clients 102, such as via networking data transfer protocols. The sources 130 may be considered to be independent from the content provider 104 and network firewall service provider 106. However, the sources 130 may utilize resources provided by a common service provider, such as a common data center provider. In other embodiments, one or more of the sources 130 may be associated with the content provider 104 or network firewall service provider 106.

Figure 2:
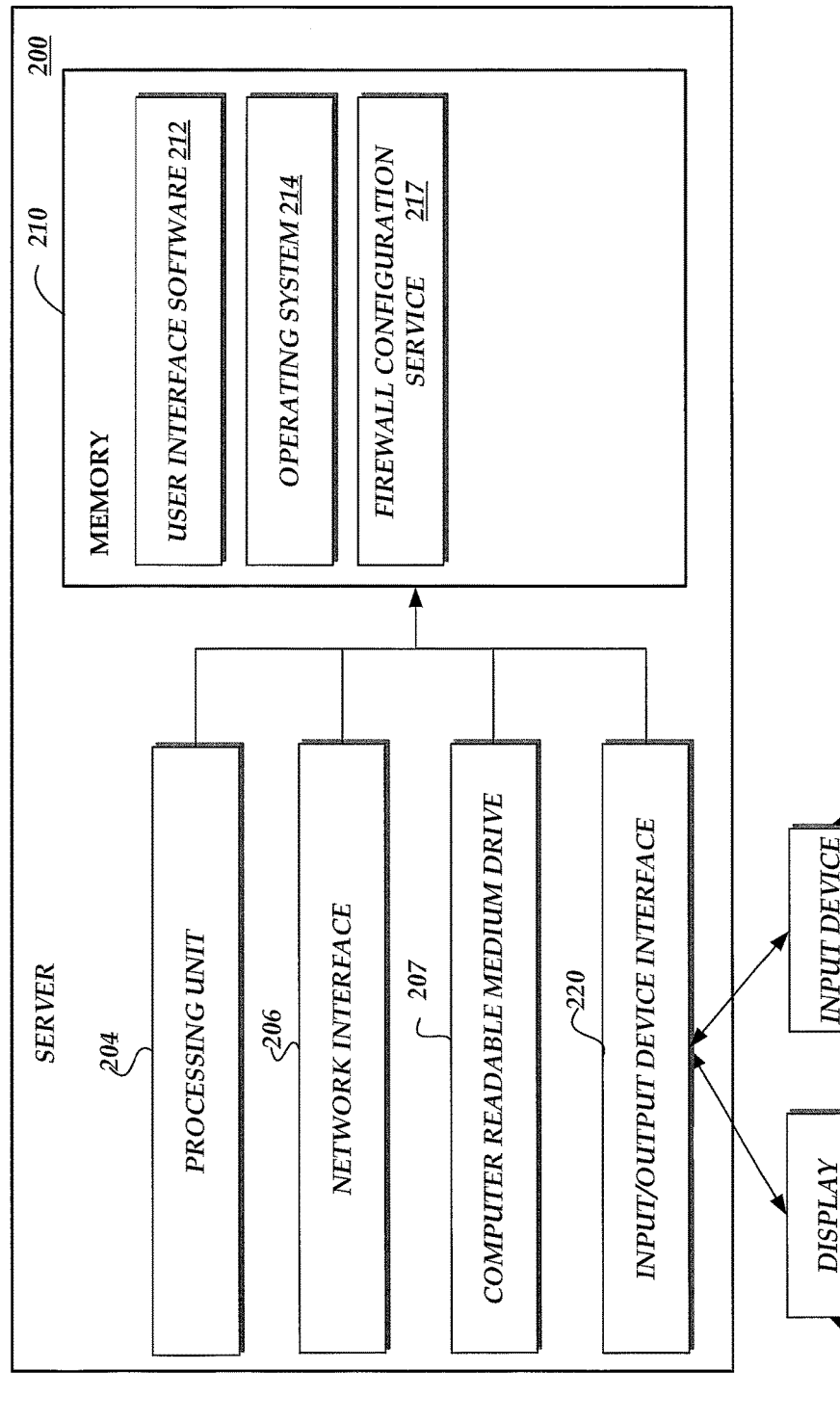
FIG. 2 schematically illustrates an example cache server hierarchy of a resource cache component compatible with certain embodiments described herein.

FIG. 2 depicts one embodiment of an architecture of a client device, identified in FIG. 2 as a customer device 102, that may implement the application or execute the code for generation of a network firewall configurations based on published network firewall configuration information described herein. The general architecture of client 102 depicted in FIG. 2 includes an arrangement of computer hardware and software components that may be used to implement aspects of the present disclosure. As illustrated, the client 102 includes a processing unit 204, a network interface 206, a computer readable medium drive 207, an input/output device interface 220, a display 202, and an input device 224, all of which may communicate with one another by way of a communication bus.

The network interface 206 may provide connectivity to one or more networks or computing systems, such as the network 116 of FIG. 1. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, etc. In some embodiments, the client 102 may include more (or fewer) components than those shown in FIG. 2. For example, some embodiments of the server 200 may omit the display 202 and input device 224, while providing input/output capabilities through one or more alternative communication channel (e.g., via the network interface 206).

The memory 210 may include computer program instructions that the processing unit 204 executes in order to implement one or more embodiments. The memory 210 generally includes RAM, ROM and/or other persistent or non-transitory memory. The memory 210 may store an operating system 214 that provides computer program instructions for use by the processing unit 204 in the general administration and operation of the client 102. The memory 210 may further include computer program instructions and other information for implementing aspects of the present disclosure. For example, in one embodiment, the memory 210 includes firewall configuration component or code 212 that utilizes published firewall configuration information from sources 130 to facilitate the generation of firewall configuration information for the network firewalls hosted on behalf of a customer. In addition, memory 210 may include or communicate with one or more auxiliary data stores.

Figure 3:
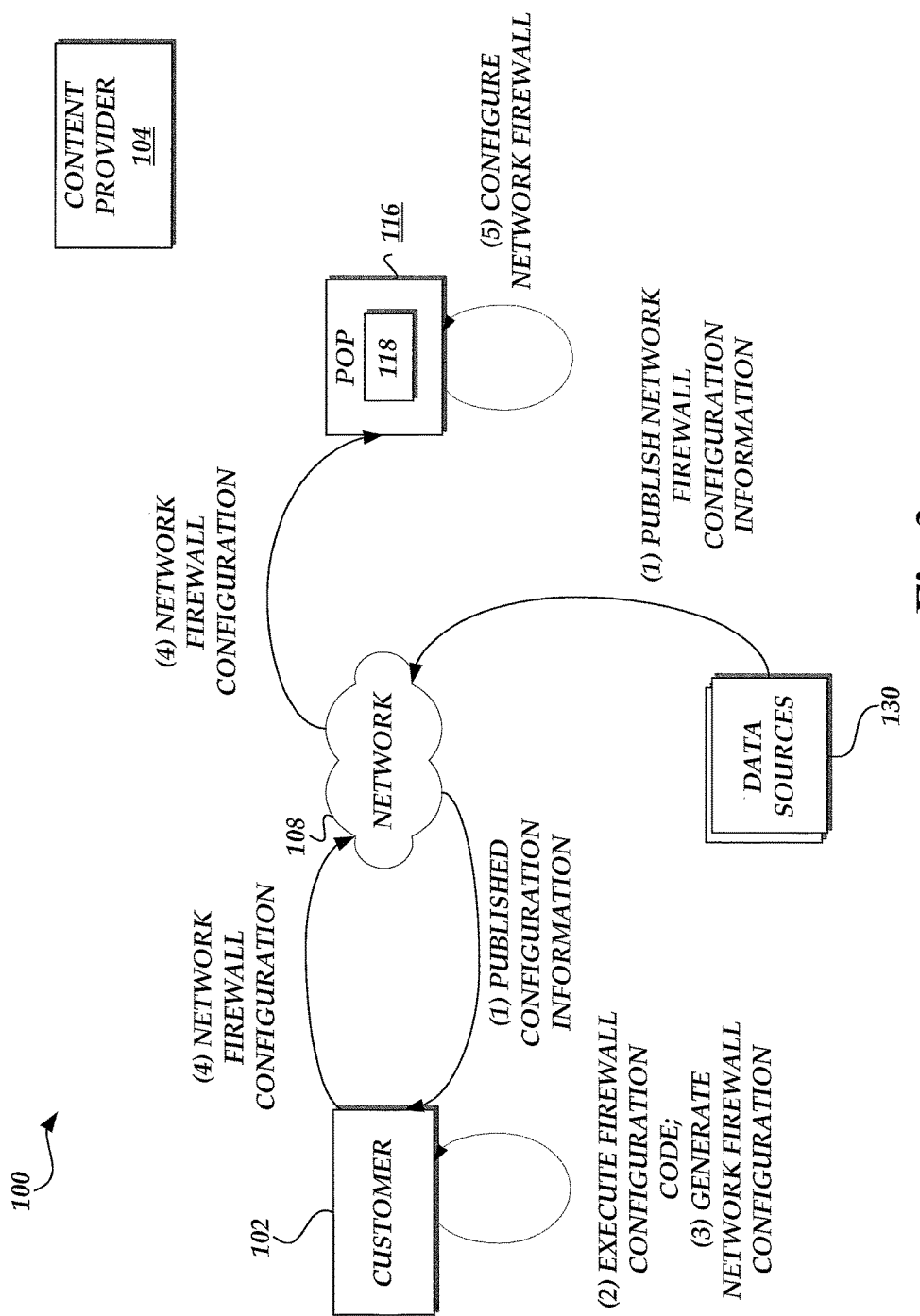
FIG. 3 is a block diagram of the communication management environment of FIG. 1 illustrating the processing of published network firewall configuration information to configure network firewalls.

FIG. 3 depicts a set of illustrative interactions related to the generation of configuration for utilization in configuration of instantiated instances of network firewalls 118, 124 hosted by the network firewall service provider 106. With reference to FIG. 3, at (1), various sources 130 publish or cause to be published, network firewall configuration information. Accordingly, the client 102 can collect independently published network firewall configuration from multiple sources to generate a set of network firewall configuration information that will be used to configure the network firewall. In this regard, the sources do not have to be independent in terms of the computing devices utilized to publish individual network firewall configuration information. Rather, the sources 130 are considered to be separate regardless of any potential relationship or other organizational commonality. Additionally, the sources 130 do not necessarily have to publish, or make available, information for purposes of network firewall configuration. Rather, one or more sources 130 may publish network address range information for a different intended purpose or with no identified purpose. For example, a source 130 may publish a list of network addresses known to be associated with particular organizations, types of actions, and the like regardless of how the published information may be utilized. Nonetheless, such information may be considered network firewall configuration information for purposes of the present application.

Illustratively, the network firewall configuration information can correspond to text files, or other data files, that identify a set of network address ranges. In one embodiment, the set of network address ranges can correspond to an identification of network address ranges that are associated with sources of network traffic that should be blocked, filtered or further processed by network firewalls 118, 124. In some embodiments, the ranges of network addresses identified in the network firewall configuration information can be a complete network address, such as full 32-bit network IP address or 128-bit network address. Although the present application will be described with illustrative example of network address ranges that may be blocked, filtered or further processed, the network firewall configuration information may also include network address ranges that can be used to instruct the network firewall to allow (e.g., not block, filter or further process) traffic associated with any network address matching the network address range. In some embodiments, the sources 130 may publish or otherwise make available network firewall configuration information having both network addresses ranges that should be blocked, filtered or further processed and network address ranges that should not be block, filtered, or further processed.

As previously described, in an alternative embodiment, the network firewall configuration information can correspond to text files, or other data files, that identify uniform resource locators ("URL") that include information used in the context of DNS request routing protocols. In this embodiment, the set of network address ranges can correspond to an identification of one or more textual descriptors that form the portion of a URL utilized in request routing. Other portions of the URL, identified as "payload1" and "payload2" would not necessarily be utilized in DNS request routing and would be considered portions utilized in HTTP routing. For example, a sample URL can be in the form of:

http://levelx.level2.level1.basedomain.com/payload1/payload2.

With continued reference to the example, the network firewall configuration information may specify the "basedomain" label that would encompass any URL including the base domain. In another example, the network firewall configuration information may specify the "basedomain" label and the first additional label, level. In other embodiments, the network firewall configuration information could include specific keywords or matching information utilized to identify specific labels, such as variations of a known bad base domain, e.g., "basedomain," "basedomain1", "almost-basedomain," and the like.

In other embodiments, the ranges of network addresses can be identified in terms of partial network addresses. In this embodiment, the partial network address corresponds to a specified number of the most significant bits of a 32-bit network IP address and is meant to encompass any network address matching the specified most significant bits regardless of whether any remaining, unspecified bits match. For example, if only the eight most significant bits are identified in the range of network address information, any network IP address having matching eight most significant bits would fall within the specified range regardless of the remaining 24 remaining bits (assuming a 32-bit address range). For purposes of discussion in the present application, a range with the least amount of specified significant bits can be considered to encompass a greater number of network addresses than a range with a greater number of specified significant bits. One skilled in the relevant art will appreciate, however, that the utilization of a 32-bit network address is illustrative in nature and should not be construed as limiting. Additionally, other formats for specifying ranges of network addresses may also be utilized.

In other embodiments, the partial network address corresponds to a specified number of the most significant bits of a 128-bit network IP address. Similar to the 32-bit network address example provided above, the specification of the most significant bits of the 128-bit address is meant to encompass any network address matching the specified most significant bits regardless of whether any remaining, unspecified bits match. For example, if only the eight most significant bits are identified in the range of network address information, any network IP address having matching 32 most significant bits would fall within the specified range regardless of the remaining 96 remaining bits (assuming a 128-bit address range). For purposes of discussion in the present application, a range with the least amount of specified significant bits can be considered to encompass a greater number of network addresses than a range with a greater number of specified significant bits. One skilled in the relevant art will appreciate, however, that the utilization of a 128-bit network address is also illustrative in nature and should not be construed as limiting. Additionally, other formats for specifying ranges of network addresses may also be utilized including additional number of network addressing bits or how partial network addresses are represented.

In some embodiments, the sources 130 may publish or make available the network firewall configuration information by actively transmitting the network firewall configuration information to one or more customers 102. In other embodiments, the sources 130 may only publish, transmit or cause to be transmitted or otherwise make available the network firewall configuration information in response to request from a customer 102. In this regard, the sources 130 and requesting clients 102 may implement additional authentication or authorization protocols and interactions to allow the clients 102 to get the information. Additionally, although FIG. 3 illustrates the information being transmitted to the client 102, the requested information may be transmitted through various additional entities, such as content provider 104, network firewall service provider 106, or other third parties/intermediaries.

Figure 5:
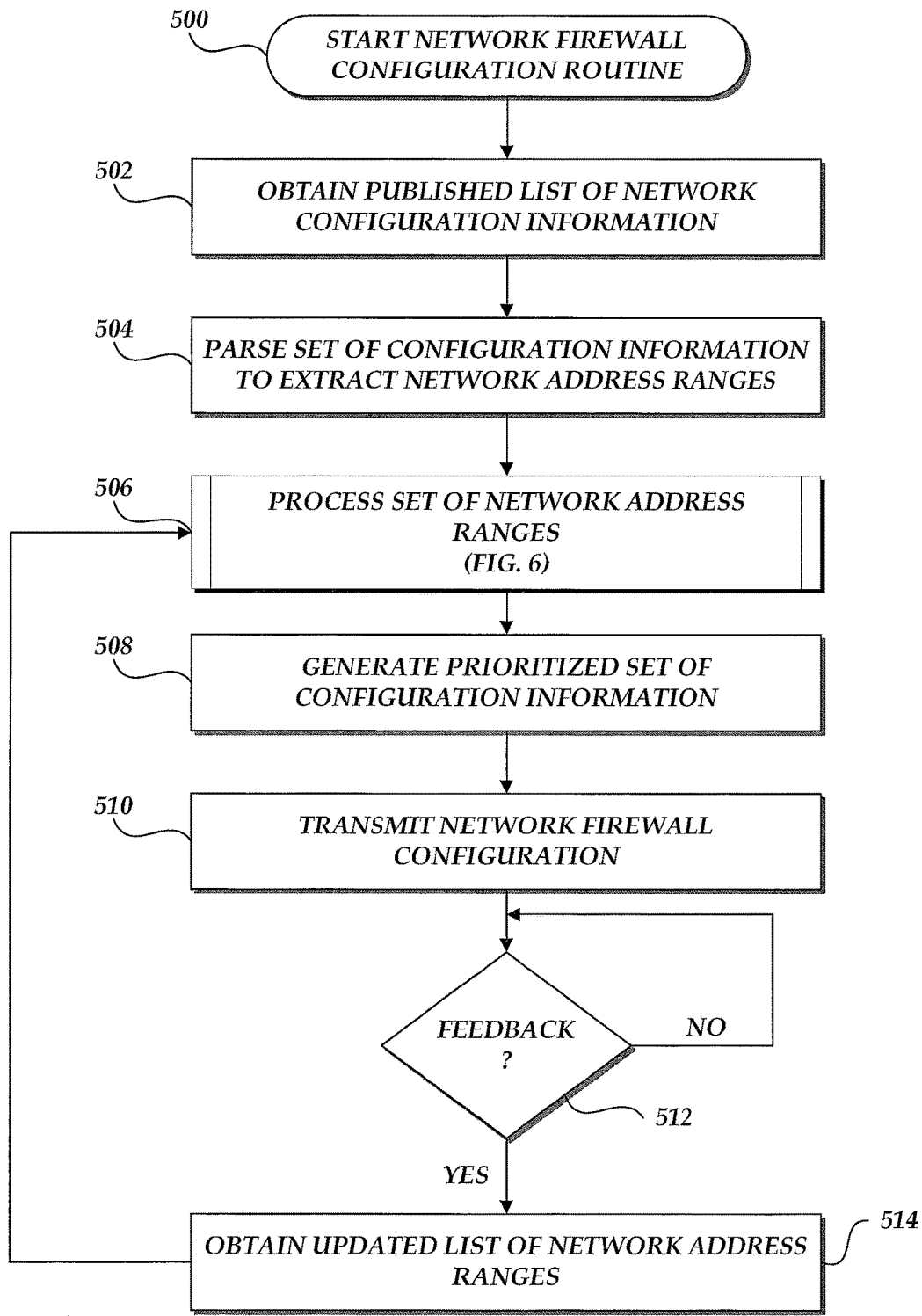
FIG. 5 is a flow diagram of a network firewall configuration routine implemented by a firewall configuration code or component executed in a client computing device.
Figure 6:
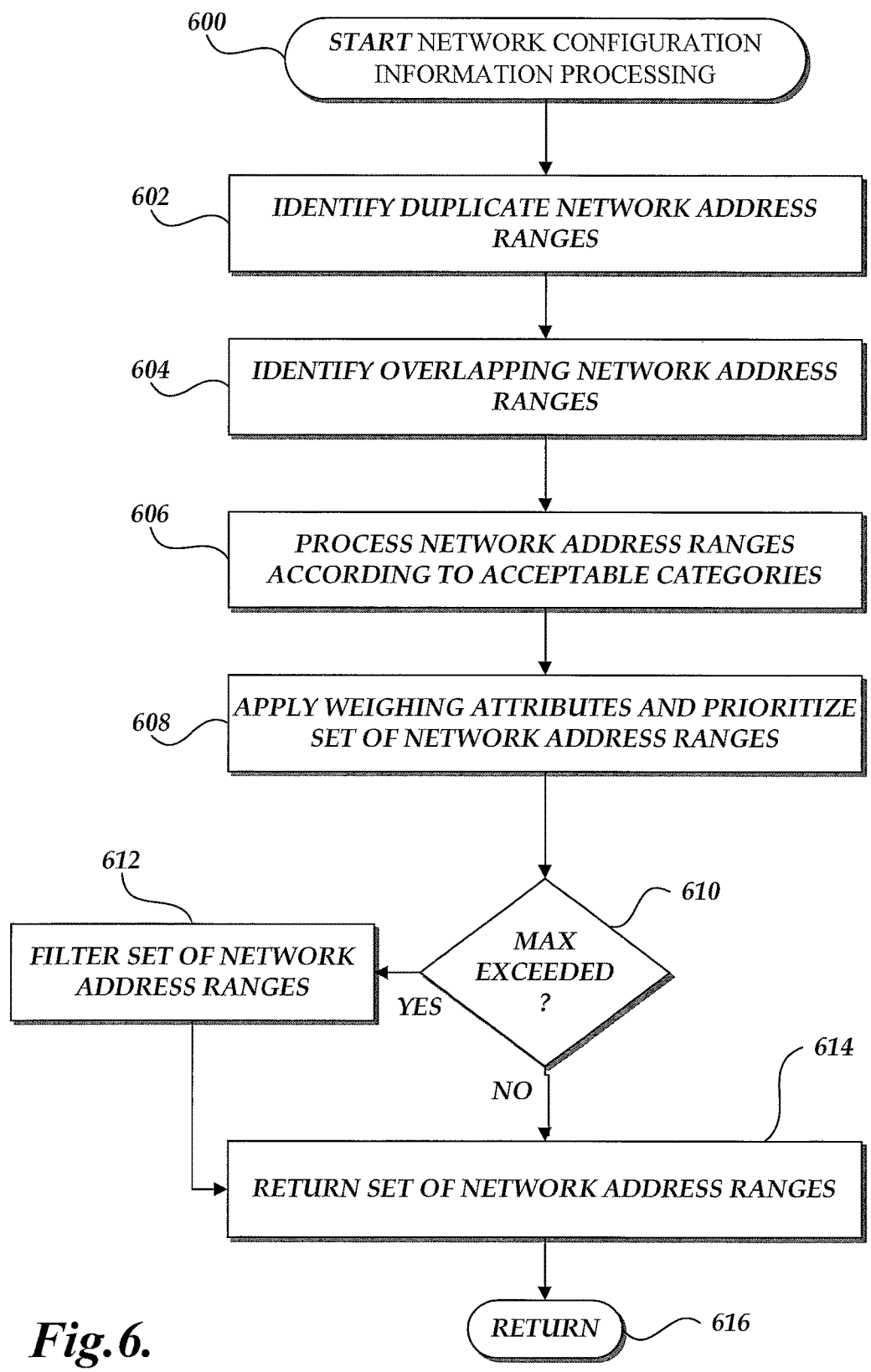
FIG. 6 is a flow diagram of a network configuration information processing sub-routine implemented by a firewall configuration code or component executed in a client computing device.

At (2), the customer 102 executes the firewall configuration code or component 216 to process the received firewall configuration information. As will be described in greater detail below, the customer 102 executes the firewall configuration code or component 216 to process a set of network address ranges included in the network firewall configuration information to form a prioritized list of network address ranges that will be used to configure network firewalls hosted by the network firewall service provider 106. FIG. 5 and FIG. 6 described a routine and sub-routine utilized in the processing of firewall configuration information and will be described in detail below. Illustratively, the prioritized list of network address ranges will serve to cause one or more network firewalls 118, 124 to block, filter or further process communications in which an origin source is associated with a network address falling with the scope of the prioritized network address ranges.

At (3), the firewall configuration code or component 216 generates the configuration information. At (4), the customer 102 transmits the generated information to be received by the firewall configuration service 128 (or directly to the network firewalls 118, 124). At (5), the network firewalls 118, 124 are updated or configured with the transmitted information. Illustratively, additional transmissions or other interactions may occur in order to transmit the network firewall configuration information or cause its incorporation within the network firewalls. In still other embodiments, it is possible that the customer 102 may generate different sets of network firewall configuration information for specific network firewalls or subsets of network firewalls. Such selective distribution of firewall configuration information may be based on the logical location of the network firewall, time of day, known traffic patterns, or customer specified criteria.

Figure 4A:
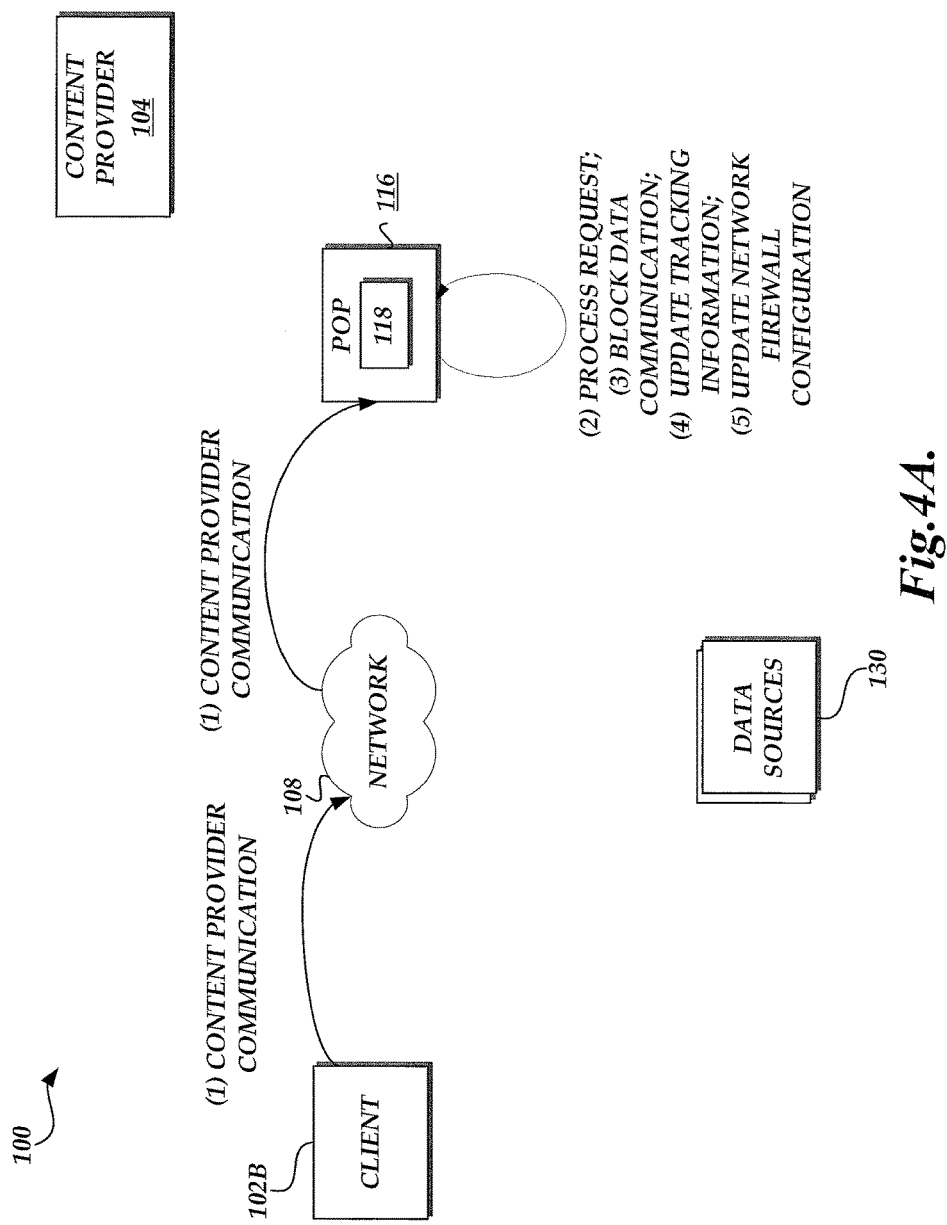
FIGS. 4A and 4B are block diagrams of the communication management environment of FIG. 1 illustrating the processing of communications based on configured network firewalls.
Figure 4B:
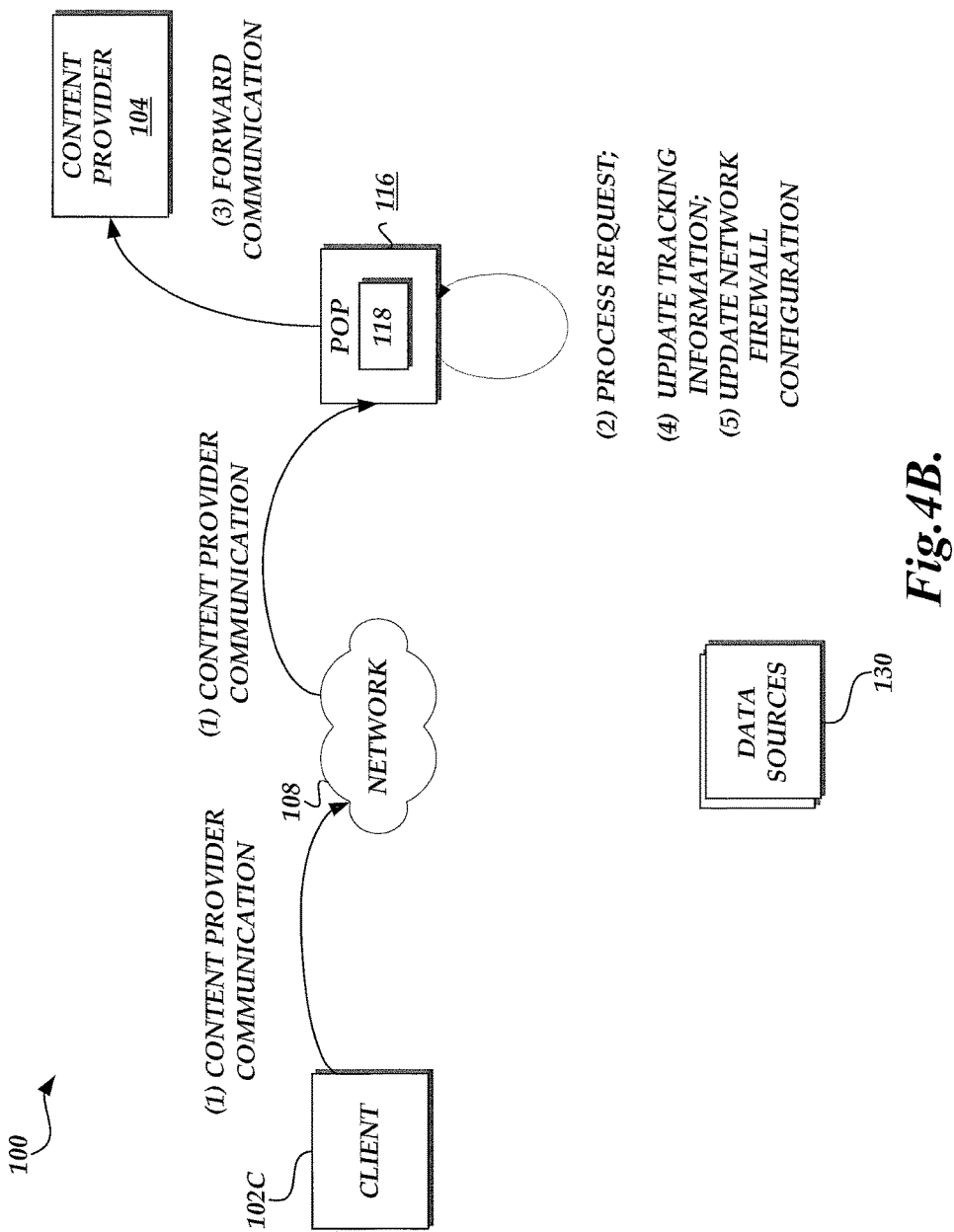

Turning now to FIGS. 4A and 4B, various interactions of the components of the communication management environment 100 for the processing of communications will be described. FIGS. 4A and 4B illustratively assume that the network firewall service provider 106 provides services on behalf of the content provider 104 to allow communications directed to the content provider to be processed by the network firewall 118, 124 before being forward to an appropriate or identified component associated with the content provider or hosted on behalf of the content provider. Illustratively, the content provider 104 and network firewall service provider 106 can utilize a variety of networking and data routing techniques/protocols to cause communications directed toward a component associated with the content provider to be received by the network firewalls 118, 124. Examples of such routing/networking techniques include variations of implementation of domain name resolution ("DNS") query processing, hypertext transfer protocol ("HTTP") processing and the like. Additionally, for purposes of the illustration, the data communications received at the network firewall can be processed to identify at least one source network address corresponding to originator of the communication, an intermediary (such as a network service provider), or other entity attributed to the communication.

With reference to FIG. 4A, an example illustration in which at least one network communication is blocked, filtered or set aside for further processing will be illustrated. At (1), a client device 102B transmits data communications which are received by the network firewall 118. At (2), the network firewall 118 processes the data communication and identifies one or more network addresses associated with the data communication. In some instances, the network firewall can identify a source address of the client device 102B transmitting the data and one or more intermediaries. In some embodiments, the network firewall service provider 106 can also obtain additional information, such as from third party sources or from the communication itself, that will assist in associating a network address with the requesting client device 102B.

Illustratively, in this example, the network firewall matches the source network address as falling within on the ranges of network addresses identified in the configuration information for the network firewall 118. Accordingly, at (3), the network firewall 118 blocks the data communication, filters the data communication or otherwise designates the data communication for further processing or isolation. For purposes of illustration, the data communication is not allowed to pass to the content provider 104 (or designated component of the content provider).

At (4), the network firewall 118 updates information indicative that a data communication matching a specified network address range was received and processed. At (5), the network firewall service provider 106 can utilize the information regarding data traffic to update prioritization rules associated with the firewall configuration code or component 216 or inform the sources 130 regarding performance of their network firewall configuration information. In some embodiments, steps (4) and (5) may be omitted or implemented separately from the processing of data communications.

With reference to FIG. 4B, an example illustration in which at least one network communication is not blocked, filtered or set aside for further processing will be illustrated. At (1), a client device 102 C transmits data communications which are received by the network firewall 118. At (2), the network firewall 118 processes the data communication and identifies one or more network addresses associated with the data communication. In some instances, the network firewall can identify a source address of the client device 102C transmitting the data and one or more intermediaries. In some embodiments, the network firewall service provider 106 can also obtain additional information, such as from third party sources or from the communication itself, that will assist in associating a network address with the requesting client device 102C.

Illustratively, in this example, the network firewall does not match the source network address as falling within on the ranges of network addresses identified in the configuration information for the network firewall 118. Accordingly, at (3), the network firewall 118 forwards the data communication to the content provider 104 or another network component to reach the content provider.

At (4), the network firewall 118 updates information indicative that a data communication not matching a specified network address range was received and processed. At (5), the network firewall service provider 106 can utilize the information regarding data traffic to update prioritization rules associated with the firewall configuration code or component 216 or inform the sources 130 regarding performance of their published network firewall configuration information. In this example, if the data communication allowed to reach the content provider 104 results in a negative action occurring at the content provider 104 or is otherwise considered to be undesirable, the corresponding network addresses associated with client 102C may be added to the sources 130 or prioritized in a manner to ensure that the network firewall is configured with the appropriate network address ranges. In some embodiments, steps (4) and (5) may be omitted or implemented separately from the processing of data communications.

Turning now to FIG. 5, a network firewall configuration routine 500 implemented by a firewall configuration code or component 217 executed in a customer 102 will be described. At block 502, the firewall configuration code or component 217 obtains a set of published or available network firewall configuration information. As previously described, a number of sources 130 publish, cause to be published or otherwise make available, network firewall configuration information. The network firewall configuration information can be generally published for no intended purpose, specifically made available for purposes of configuring aspects of a network firewall, or specifically published for a different, alternative, or combined purpose. Accordingly, the firewall configuration code or component 217 can collect a set of network firewall configuration information corresponding to the various sources 130 that have individually made available network firewall configuration information. Illustratively, the network firewall configuration information can correspond to text files, or other data files, that identify a set of network address ranges. In some embodiments, the ranges of network addresses identified in the network firewall configuration information can be a complete network address, such as full 32-bit network IP address or full 128-bit network IP address. In other embodiments, the ranges of network addresses can be identified in terms of partial network addresses.

In some embodiments, the sources 130 may publish the network firewall configuration information by actively transmitting the network firewall configuration information to one or more customers 102. In other embodiments, the sources 130 may only publish, transmit or cause to be transmitted, or make available the network firewall configuration information in response to request from a customer 102. In this regard, the sources 130 and requesting customers 102 may implement additional authentication or authorization protocols and interactions to allow the customer 102 to get the information. Still further, customers 102 may also receive the network firewall configuration information indirectly through the utilization of a service provider or other intermediary.

At block 504, the firewall configuration code or component 217 parses the set of collected network firewall configuration information. In some embodiments, the set of collected network firewall configuration information can be limited to textual network address ranges. In other embodiments, the collected network firewall configuration information can include additional information related to the management of the network firewalls or not intended for network firewall. Accordingly, the firewall configuration code or component 217 can utilize any one of a variety of algorithms or processes to parse the collected network firewall configuration information to identify one or more network address range. The processed information can correspond to a list of network address ranges.

At block 506, the firewall configuration code or component 217 processes the list of network address ranges. In one aspect, the firewall configuration code or component 217 can utilize or implement a number of additional processing steps to remove duplicate network address range entries or combine network address range entities that have overlapping values. In another aspect, the firewall configuration code or component 217 can further process any network address ranges that are specified in a partial network address format that may not be supported by the network firewalls or specific subsets of network firewalls. In a further aspect, the firewall configuration code or component 217 can prioritize or reorder the list of network address ranges based on various sorting or weighing criteria. The sorting or weighing criteria can be associated with the network address ranges information or the sources 130 that provided the network firewall configuration information. In still a further aspect, the firewall configuration code or component 217 can limit the set of network address ranges to meet thresholds, such as a maximum address threshold. An example sub-routine 600 (FIG. 6) utilized by the firewall configuration code or component 217 to process the list of network address ranges will be described below.

The following code samples illustrate sample executable code for implementing functionality associated with the firewall configuration code or component 217. Such code is illustrative in nature and should not be construed as limiting:

```
 * Maximum number of IP descriptors per IP Set
 */
var maxDescriptorsPerIpSet = 1000;
/**
```

```
 * Maximum number of IP descriptors updates per call
 */
var maxDescriptorsPerIpSetUpdate = 1000;
List.prototype.getRanges = function (callback) {
    var list = this;
    var ranges = [ ];
    https.get(this.url, function (response) {
        // create a reader object to read the list one line at a time
        var reader = readline.createInterface({ terminal: false, input: response });
        reader.on('line', function (line) {
            var result = list.regex.exec(line);
            // if there is a result, a range has been found and a new range is created
            if (result) {
                ranges.push(new Range(list, result[1]));
            }
        });
        reader.on('close', function ( ) {
            console.log(ranges.length + 'address ranges read from' + list.url);
            callback(null, ranges);
        });
    }).onCerrof, function (err) {
        console.error('Error downloading' + this.url, err);
        callback(err);
    });
};
/**
 * Sorts an array of ranges by largest first
 * @param {Range[ ]} ranges - List of ranges
 */
function prioritizeRanges(ranges) {
    ranges.sort(function (a, b) {
        return a.mask - b.mask;
    });
    logRanges(ranges, 'after prioritzing');
}
/**
 * Removes ranges from a list if they are contained within other ranges
 * @param {Range[ ]} ranges - List of ranges
 */
function removeContainedRanges(ranges) {
    for (var i = 0; i < ranges.length; i++) {
        var range =ranges+i+;
        for (var j = 0; j < ranges.length; j++) {
            var other = ranges[j];
            if (range.contains(other) && (j !== i)) {
                ranges.splice(j, 1);
                if (j < i) {
                    i--;
                }
                j--;
            }
        }
    }
    logRanges(ranges, 'after removing contained ones');
}
/**
 * Split ranges into smaller /8, /16, /24 or /32 ranges
 * @param {Range[ ]} ranges – Array of ranges
 */
function splitRanges(ranges) {
        // For example = /15 can be decomposed into 2 /16 ranges, /17 can be decomposed
into 64 /14 ranges
    for (var i = 0; i < ranges.length; i++) {
        var range = ranges[i];
        var list = range.list;
        var mask = range.mask;
        var supportedMask = (mask <= 8 ? 8 : mask <= 16 ? 16 : mask <= 24 ? 24 : 32);
        var supportedMaskDifference = supportedMask – mask;
        // Check if the mask is not a /8, /16, /24 or /32
        if (supportedMaskDifference > 0) {
    var size = Math.pow(2, 32 – supportedMask);
    var count = Math.pow(2, supportedMaskDifference);
    var newRanges = [ ];
    // create new ranges that have /8, /16, /24 or /32 masks to replace this
    for (var j = 0; j < count; j++) {
        newRanges.push(new Range(list, range.number + (j * size), supportedMask));
    }
    // Insert the new ranges into the array, removing this one
    Array.prototype.splice.apply(ranges, [i, 1].concat(newRanges));
```

```
        // move the pointer to after the newly-inserted ranges
        i += newRanges.length - 1;
      }
    }
  }
  logRanges(ranges, 'after splitting to /8, /16, /24 or /32 ranges...');
}
```

At block 508, the firewall configuration code or component 217 generates configuration information based on the generated prioritized list of network address ranges and in a form utilized to configure a network firewall. In some embodiments, the format of the configuration information can vary according to different network firewall implementation specifications and may require additional information or further processing of the prioritized list of network address ranges. In other embodiments, the prioritized list of network address ranges may be ready for implementation by a network firewall and does not require further processing or generation as indicated in block 508. At block 510, the customer 102 transmits the generated information to be received by the firewall configuration service 128 (or directly to the network firewalls 118, 124). The network firewalls 118, 124 are updated or configured with the transmitted information. Illustratively, additional transmissions or other interactions may occur in order to transmit the network firewall configuration information or cause its incorporation within the network firewalls. In still other embodiments, it is possible that the customer 102 may generate different sets of network firewall configuration information for specific network firewalls or subsets of network firewalls. Such selective distribution of firewall configuration information may be based on the logical location of the network firewall, time of day, known traffic patterns, or customer selection.

In some embodiments, routine 500 can include a feedback loop that facilitates the updating of the ordered list of network address ranges, the re-ordering of the list of network address ranges, modification of the number of network address ranges identified in the set, and the like. In such embodiments, the feedback can be based on updates provided by the sources 130. In other embodiments, the feedback can be based on information collected by the network firewalls or provided by the network firewall service provider 106 or other entity. At decision block 512, a test is conducted to determine whether feedback exists. If so, at block 514, the firewall configuration code or component 217 firewall configuration code or component 217 processes the feedback and obtains updates to the set of network address ranges in accordance with the feedback. The routine 500 returns to block 506 to process the updated set of network address range information. Alternatively, if at decision block 512 there is no feedback or if the feedback does not otherwise cause a change in the set of network address ranges, the routine 500 returns to decision block 512.

FIG. 6 is a flow diagram of a network configuration information processing sub-routine 600. Illustratively, sub-routine 600 is implemented by a firewall configuration code or component 217 executed in a customer 102. Routine 600 includes various steps relate to the processing of the set of network address information. In some embodiments, all the identified blocks may be implemented. In other embodiments, subsets of the blocks may be implemented. At block 602, the firewall configuration code or component 217 identifies any duplicate network address ranges. Illustratively, the firewall configuration code or component 217 can eliminate any duplicate network address ranges. Additionally, the firewall configuration code or component 217 can note if multiple sources 130 have identified the same network address ranges for purposes of prioritizing any network address ranges that have been validated by multiple sources 130.

At block 604, the firewall configuration code or component 217 identifies any overlapping or combinable network address ranges. In one aspect, the firewall configuration code or component 217 can combine entries of network address ranges that overlap or partially overlap. In other aspects, the firewall configuration code or component 217 can delete any network address ranges that are considered a subset or a subnet of a larger network address range. For example, in a 32-bit network address environment, if the combined list of network address ranges includes an address range that specifies the 16 most significant bits and an address range that specifies 24 most significant bits encompassed within the previous 16 most significant bit address range, the address range with the 24 most significant bit range can be deleted as a subset or subnet of the specified 16-bit address range. In a further example, the firewall configuration code or component 217 can combine two or more specified network address ranges into a larger specified network address range. Similar scenarios could also occur in environments utilizing a different number of bits to represent network addresses.

At block 606, the firewall configuration code or component 217 can process the specified network address ranges into a form acceptable by the network firewall. In one embodiment, the firewall configuration code or component 217 can limit the network address ranges to specific categories of network address ranges. For example, in a 32-bit network address environment, the firewall configuration code or component 217 can limit network address ranges to be specified as 8 most significant bits (e.g., "/8"), 16 most significant bits (e.g., "/16"), 24 most significant bits ("/24") or 32 most significant bits (e.g., "/32"). In one embodiment, the firewall configuration code or component 217 can utilize multiple network address ranges having more specified significant bit ranges to equate or partially equate to the specified network address range. In another embodiment, the firewall configuration code or component 217 can utilize a single network address range having a lesser number of specified significant bits to encompass the specified network address range. In other embodiments having a different number of bits representing a network address, the specific categories that are acceptable can be different or there can be additional categories based on the requirements or capabilities of the network firewalls.

By way of example, in a 32-bit network address environment, the firewall configuration code or component 217 can transform a network address range is specified in the list having 15 most significant bits (e.g., "/15") into a set of two /16 network address ranges. In another example, the firewall configuration code or component 217 can transform a network address range specified with 14 most significant bits (e.g., "/14") into four respective /16 network address ranges. As an example of a potential different approach, the firewall configuration code or component 217 can replace a network address range is specified in the list having 9 most significant bits (e.g., "/9") with a /8 network address range in a manner that the /9 is a subset or subnet of the network address range. In this example, the single specified network address range would encompass a larger number of network addresses than the specified network address range. In another example, the firewall configuration code or component 217 can replace two network address range is specified in the list having 17 most significant bits (e.g., "/17") with a /16 network address range in a manner that two /17 network address ranges would be fully subsumed by the single /16 network address range. Depending on the algorithm utilized for the transformation, in some embodiments, the modification of the network address ranges not conforming to the specific categories into a smaller set of acceptable category of network address ranges may result in potential gaps in network address if the smaller set of acceptable category address ranges only partially equate to the specified network address range. In other embodiments, the modification of the network address ranges not conforming to the specific categories into a larger set of acceptable category of network address ranges may result in potential false positives.

At block 608, the firewall configuration code or component 217 applies a weighing factor to network address ranges in the list and prioritizes the list. In one aspect, the firewall configuration code or component 217 can prioritize based on the size of the specified network address range, with greater priority given to the larger network address ranges. For example, a /8 network address range is larger than a /16 and would be prioritized higher since it would encompass a large amount of potential negative network addresses. In another aspect, the firewall configuration code or component 217 can prioritize based on scores or weighting given to the source 130 that provided the network address ranges (or network firewall configuration information). In this aspect, the prioritization weighing factor can be based on a trust associated with the sources which can be adjusted based on a perceived quality or perceived performance of the network firewall configuration information. In a further aspect, the firewall configuration code or component 217 can prioritize based on any network address ranges that are identified by multiple sources 130.

In still a further aspect, the firewall configuration code or component 217 can also prioritize any specific, singular network address that may correspond to a particular device or set of devices. In this aspect, the firewall configuration code or component 217 can determine if a /32 network address (not a range) is so specific to an identifiable device that the network address needs to be prioritized. In still another aspect, the firewall configuration code or component 217 can also utilize non-overlapping network address ranges to prioritize the list of network addresses. In this aspect, if two sources have disagreement as to whether a particular range of network addresses should be identified, those ranges may prioritized lower. Additional or alternative prioritization may also be included or incorporated.

At decision block 610, a test is conducted to determine if the size of the list exceeds a maximum threshold. Illustratively, the network firewalls may limit the number of network address ranges that can be accepted as part of the network firewall configurations. For example, in some embodiments, the network firewalls can accept 10000 network address ranges, specified as a set of ten 1000 network address sets. The size of the thresholds can be set based on performance parameters of the network firewalls, the level of service provided/selected by the customer and the like. If the number of network address ranges exceeds the threshold, at block 612, the firewall configuration code or component 217 filters the prioritized list to get the number of network address ranges below the threshold.

If at decision block 610 the number of network address ranges does not exceed the threshold or once the number of network address ranges falls below the threshold (block 612), at block 614, the firewall configuration code or component 217 returns the set of network address ranges and the sub-routine 600 terminates.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A method for managing network-based communications comprising:
    obtaining a set of network firewall configuration information for configuring a network firewall on behalf of a customer from a plurality of sources, wherein individual network configuration information is provided by a source different from a network point of presence;
    parsing the set of network firewall configuration information to identify a list of network address information, the list of network address information associated with one or more source network address ranges;
    processing the list of network address information, wherein processing the list of network address information includes prioritizing the list of network address information based on a size of source network address range in the list of network address information and a weight of a source of the network firewall configuration information, wherein the prioritized list is ordered such that a larger source network address range is listed before and has a higher priority relative to a smaller source network address range;
    processing the prioritized list of network address information to limit a number of network address ranges in the prioritized list of network address information to be below a maximum threshold;
    generating network firewall configuration information for the network firewall on behalf of the customer based on the prioritized list of network address information, wherein the generated network firewall configuration information causes communications from a network address that is included in the prioritized list to be blocked; and
    causing the network firewall to be configured based on the generated network firewall configuration information.

2. The method as recited in claim 1, wherein processing the list of network address information includes removing any duplicate network address ranges.

3. The method as recited in claim 1, wherein processing the list of network address information includes identifying network address ranges that are subsets of another network address range and removing the identified network address ranges.

4. The method as recited in claim 1 further comprising identifying network address ranges in the list of network address ranges that do not match a pre-established range of network address information.

5. The method as recited in claim 4 further comprising processing any identified network address ranges in the list of network address ranges that do not match a pre-established range of network address information to generate two or more supplemental network address ranges corresponding to the pre-established range of network address information.

6. The method as recited in claim 1 further comprising causing configuration of a plurality of network firewalls located at one or more network points of presence.

7. Non-transitory computer storage storing computer-executable instructions, wherein the computer-executable instructions cause one or more computing devices to perform a process for managing network-based communications comprising:

obtaining a set of network firewall configuration information for configuring a network firewall on behalf of a customer, wherein individual network configuration information is provided by a source different from a network point of presence;

processing the set of network firewall configuration information to identify a list of network address information, the list of network address information associated with one or more source network address ranges;

prioritizing the list of network address information based on a size of source network address range in the list of network address information and a weight of a source of the network firewall configuration information, wherein the prioritized list is ordered such that a larger source network address range is listed before and has a higher priority relative to a smaller source network address range;

processing the prioritized list of network address information to limit a number of network address ranges in the prioritized list of network address information to be below a maximum threshold;

generating network firewall configuration information for the network firewall on behalf of the customer based on the prioritized list of network address information, wherein the generated network firewall configuration information causes communications from a network address that is included in the prioritized list to be blocked; and causing the network firewall to be configured based on the generated network firewall configuration information.

8. The non-transitory medium as recited in claim 7 further comprising parsing the set of network firewall configuration information to identify a listing of network address information, the list of network address information corresponding to one or more source network address ranges.

9. The non-transitory medium as recited in claim 7, wherein processing the list of network address information includes prioritizing the list of network address information based on historical information.

10. The non-transitory medium as recited in claim 9, wherein the historical information identifies a rating associated with previous network firewall configuration information.

11. The non-transitory medium as recited in claim 7, wherein obtaining a set of network firewall configuration information for configuring network firewalls includes obtaining network firewall configuration information from two or more sources.

12. The non-transitory medium as recited in claim 11, wherein processing the list of network address information includes prioritizing the list of network address information based on network address ranges identified in the network firewall configuration information from the two or more sources.

13. The non-transitory medium as recited in claim 7, wherein the network firewall configuration corresponds to a text file including a list of network address ranges.

14. The non-transitory medium as recited in claim 7, wherein processing the list of network address information includes at least one of identifying any subsets of network address ranges and removing any subsets of network address ranges.

15. The non-transitory medium as recited in claim 7 further comprising:

obtaining information corresponding to operation of one or more network firewall services based on the generated network firewall configuration information; and associating at least one weighing factor for a source based on the obtained information.

16. The non-transitory medium as recited in claim 7, wherein the network firewall configuration corresponds to network address ranges that should be blocked by the network firewall.

17. A system comprising:

one or more hardware computing devices in communication with one or more computer-readable memories storing executable instructions, the one or more hardware computing devices programmed by the executable instructions to at least:

obtain a set of network firewall configuration information for configuring a network firewall on behalf of a customer, wherein individual network configuration information is provided by a source different from a network point of presence;

process the set of network firewall configuration information to identify a list of network address information, the list of network address information associated with one or more source network address ranges;

prioritize the list of network address information based on a size of source network address range in the list of network address information and a weight of a source of the network firewall configuration information, wherein the prioritized list is ordered such that a larger source network address range is listed before and has a higher priority relative to a smaller source network address range;

process the prioritized list of network address information to limit a number of network address ranges in the prioritized list of network address information to be below a maximum threshold;

generate network firewall configuration information for the network firewall on behalf of the customer based on the prioritized list of network address information, wherein the generated network firewall configuration information causes communications from a network address that is included in the prioritized list to be blocked; and cause configuration of the network firewall in accordance with the generated network firewall configuration information.

18. The system as recited in claim 17, wherein the one or more hardware computing devices are further programmed to prioritize the list of network address information based on at least one of a weighing factor associated with a source of the network firewall configuration information or historical information.

19. The system as recited in claim 17, wherein the one or more hardware computing devices are further programmed to process the prioritized list of network address information so that a number of network address ranges identified in the prioritized list of network address information falls below a maximum threshold.

20. The non-transitory medium as recited in claim 7, wherein configuring the network firewall includes causing at least one additional network address to be blocked by the network firewall.

* * * * *